Nov. 13, 1956  O. D. WELSCH  2,770,365
VACUUM FLOTATION AND LIQUID PURIFICATION APPARATUS AND PROCESS
Filed Oct. 1, 1952
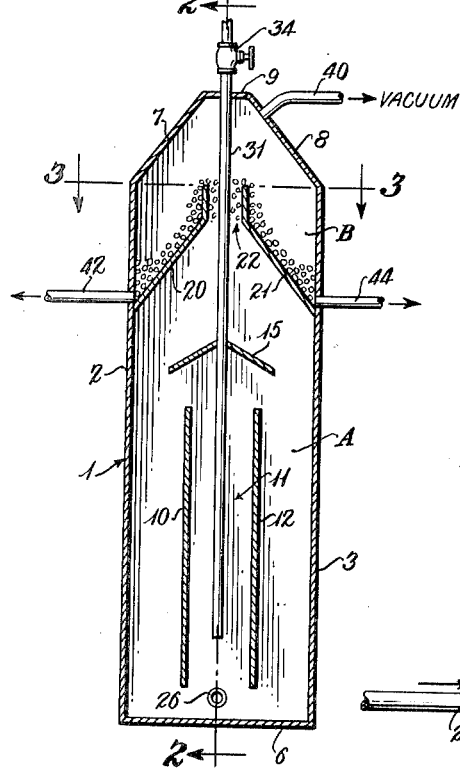
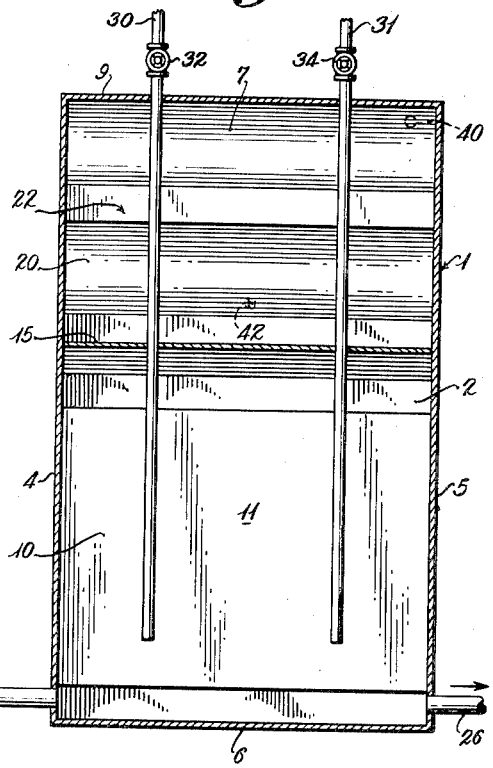
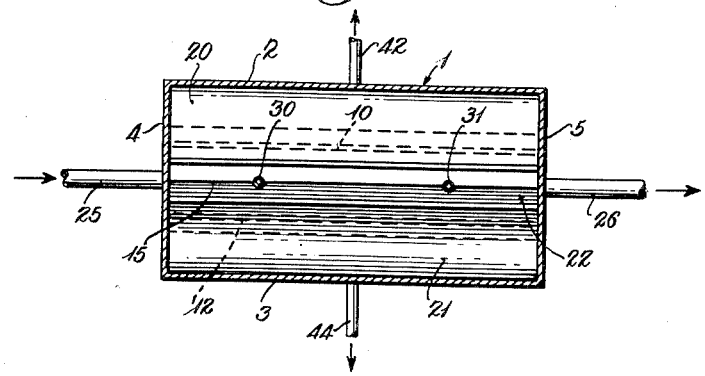
INVENTOR
*Otis D. Welsch*
BY *Charles M. Thomas*
ATTORNEY

United States Patent Office 2,770,365
Patented Nov. 13, 1956

2,770,365

VACUUM FLOTATION AND LIQUID PURIFICATION APPARATUS AND PROCESS

Otis D. Welsch, Tonopah, Nev.

Application October 1, 1952, Serial No. 312,461

3 Claims. (Cl. 210—53)

This invention relates to the concentration, clarification and purification of waste waters, such as industrial waste waters or sewage, the process and apparatus being designed to function on a vacuum flotation principle.

More particularly, the invention relates to an apparatus and process which, in the flotation of such waste, or of minerals, contemplates the use of aeration in a manner whereby atmospheric air is drawn into the solid-liquid mixture by a vacuum or reduced pressure maintained within the reaction compartment. The invention contemplates separation of solids from liquid by a uniform rising of such solids past a baffle structure, the lifting being accomplished or induced by the imposition of a vacuum in the upper portion of the reactor or vessel.

A principal object of my invention is the provision of an apparatus and process which will create a more efficient agitation and circulation of the solid-liquid mixture than can be obtained in devices and processes heretofore known to the art under conditions of vacuum or reduced pressure. Because of a continual upward movement of one phase of circulation of the solid-liquid mixture from the feed inlet to the discharge outlet, the agitation and circulation provided in my invention promotes a faster and more efficient flotation and elimination of the desired solids from the solid-liquid mixture.

It is a further objective of my invention to accomplish this high degree of agitation and circulation by means of atmospheric air drawn into the apparatus by the reduction of pressure within the separator compartment.

Another objective of the invention is the provision of means to continually cycle atmospheric air into solid-liquid mixtures by an induced vacuum for the purpose of creating a high degree of reactivity between the oxygen drawn into the solid-liquid mixture and the solids commonly found in such materials as industrial waste waters or sewage. The process is thus particularly applicable to sewage treatment.

Another object of the invention is the provision of an efficient, yet simple, apparatus and process which can be controlled easily by the operator and can be installed at very low cost.

My basic concept of a floatable solid is that the solid particle be enveloped or filmed with a gaseous substance. This gaseous filmed solid is then in effect a weighted bubble. Under conditions of vacuum this gaseous film expands, thereby imparting buoyancy to the solid particle. This buoyancy makes possible the rising of the solid particle to the surface of the pulp or sewage. The atmospheric air drawn into the solid-liquid mixture is dispersed through the solid-liquid mixture in the form of bubbles. There bubbles tend to rise to the surface of the solid-liquid mixture. Bubbles of gas are also formed when the dissolved gases of the liquid become insoluble under conditions of a vacuum. Because of the agitation and circulation of the solid-liquid mixture the gaseous filmed solids have many opportunities to collide with the countless gas bubbles created in the solid-liquid mixture. Upon collision, the gas of the bubble coalesces with the gas of the gaseous filmed solid and the solid becomes attached to the colliding bubble. Increased buoyancy for the solid results. The greater the buoyancy imparted to the solid, the better the chance of the solid being floated to the surface of the solid-liquid mixture.

In the present invention, this view of the basic condition of flotation, wherein a gaseous filmed solid is caused to rise to the surface, is considered of essential importance, as under reduced pressure or vacuum gases surrounding such particles expand and increase in volume. This increase in the volume of the gaseous film results in a decrease of the specific gravity of the mass represented by the combined solid and its gaseous film. The resulting effect is that buoyancy is imparted to such solid particles causing them to rise and float upon the surface of the mixture.

The gaseous film surrounding each tiny particle, such as described in the foregoing, may be one of the products of reaction between soluble compounds in the liquid and components on the surface of such solids. In the case of sewage or industrial waste waters, such soluble compounds may be considered as products of the decomposition or digestion of organic material. Ordinarily, organic acids are formed in decompositions of organic materials and the chemical action of such acids upon the solids of the mixture inevitably evolves gases of various compositions. It is felt that in the practice of the present invention, these gases film or envelop the minute suspended solids of the mixture, so that, under reduced pressures or vacuum operation, their overall specific gravities are reduced to such an extent as to render them buoyant in the described manner.

There are certain optimum conditions for the successful performance of the apparatus and process herein disclosed which should be observed.

Firstly, to insure maximum development of gases of the type that will film such solids, optimum pH conditions must be maintained in order that the proper gaseous reaction products will be formed. It has been found that a pH of approximately 7 of, for example, sewage water promotes a condition for rapid chemical activity evolving gaseous reaction products which readily forms films for the organic or other solids of the mixture.

Secondly, aeration of the mixture is vital as a means of introducing oxygen into the solution for promotion and maintenance of such chemical activity. Aeration is likewise important as a means to furnish the necessary gaseous medium which forms the bubbles necessary for formation of the froth.

Thirdly, constant agitation in the compartment is essential to maintain the solids of the mixture in constant suspension and movement, thereby accelerating chemical reaction between the substances of the mixture. In the instant invention, agitation is accomplished by the conjoint effect of air introduction into the bottom of the compartment and imposition of a vacuum at the top thereof.

Fourthly, circulation, as well as agitation, is essential to cause optimum separation between solids and liquid of the mixture. In the instant invention, this circulation is obtained by utilizing a vacuum principle wherein agitation is furnished by air bubbled into the mixture, the latter constantly being caused to rise within the compartment. Direction of movement of the solid-liquid mixture is obtained by utilizing a suitable baffle and the mixture is thereby caused to develop a helical course from inlet to discharge outlet, thereby facilitating separation. The baffle also functions to break up or separate large bubbles of the froth into many smaller ones, which are more effective in the flotation procedure of this invention.

Reference will now be made to a more particular description of my invention as disclosed in the drawings, wherein:

Figure 1 is a cross section of the apparatus used in practicing the invention.

Figure 2 is a section taken on the line 2—2 of Figure 1.

Figure 3 is a section taken on the line 3—3 of Figure 1.

Referring in more detail to these several views of the apparatus, it is seen that the closed compartment or reactor is generally indicated at 1. As herein shown, it is rectangular in shape, provided with sides 2 and 3 and ends 4 and 5, all mounted on a base member 6.

The top of the chamber 1 is comprised of two angularly disposed plates 7 and 8 which are interconnected at their upper extremities by an additional transverse plate 9. Obviously, these several walls of the compartment can be fabricated in one piece or separately, as desired.

The compartment 1 is divided into a lower separating zone or chamber A and an upper separating zone or chamber B by means to be hereinafter described.

Located near the bottom of the compartment and in separating zone or chamber A is a well, or additional chamber, generally indicated at 11. It is open at top and bottom and formed of two longitudinal plates 10 and 12, affixed at each of their opposite ends to the end plates 4 and 5 of the chamber 1. These members 10 and 12 are parallel to each other and positioned a relatively short distance above the base of the compartment 1 and extend approximately to the middle thereof. Such plates also extend from the feed to the outlet end of the compartment.

Superimposed above and appreciably spaced from said longitudinal plates is a baffle 15 which, in this embodiment of the invention, has the shape of an inverted V, or with the sides thereof extending downwardly toward the bottom of the compartment. As herein depicted, such baffle 15 is located a short distance above the middle of the compartment 1 and in the upper part of zone A. It extends from end to end of the compartment. The purpose of this baffle is to deflect the course of the rising current of solid-liquid mixture in the lower part of the separating chamber, or separating zone A thereof, promoting agitation and separation of the solid-liquid mixture therein.

A plurality of downwardly extending pipes, such as those indicated at 30 and 31 are located on the center line of the compartment 1. These pipes terminate in the lower portion of the compartment and discharge at a point between the plates 10 and 12 of lower separating zone A and appreciably above the bottom thereof. Although only two of such pipes are shown in the preferred embodiment of the invention, it will be understood that any desired number may be employed depending upon the particular conditions encountered, such as the length of the compartment, materials treated therein, etc. Such pipes 30 and 31 are supplied for the purpose of leading air from the atmosphere, or oxygen, into the lower separating zone of the compartment. Each of such pipes are provided with control valves 32 and 34 respectively utilized for the obvious purpose of controlling the amount of air admitted, so that admission thereof may be regulated to its optimum degree.

The additional separation zone B in the upper portion of the compartment is bounded by two angular plates 20 and 21, secured to the side walls 2 and 3 respectively of the compartment. These plates divide the reactor into the two separating zones A and B, heretofore referred to. At their upper edges, each of these plates are flanged in a vertical direction to provide upwardly extending lips forming a space or opening 22 therebetween. The floatable solid materials, because of buoyancy resulting from the expansion of their gaseous films due to reduced pressure and/or attachment to bubbles created within the solid-liquid mixture, find an exit through this opening 22 to zone B of the apparatus. They then slide down the exterior of each of the plates 20 and 21 and are discharged from the compartment through appropriate discharge lines 42 and 44.

An inlet for the solid-liquid mixture, ore and water mixture or other waste materials is provided on one side of the compartment 1 and in the bottom of lower separating zone A, as indicated at 25. The outlet 26, for residue after separation, is in line therewith and opposed thereto upon the other side of the compartment.

A vacuum is induced as indicated in Figure 1 by a line 40 leading from a suitable vacuum source to the upper, or separating zone B, of the compartment. As shown, the vacuum line is directed to a point approximately over the opening 22.

In the practical use of the invention described in the foregoing, a solid-liquid mixture of waste materials is introduced into the compartment through inlet 25 and a vacuum applied to line 40 in the upper part of the reactor vessel. Lines 30 and 31 are opened to the desired extent to permit atmospheric air to be admitted to the separating zone A through lines 30 and 31, which, as stated, are located at desired distances throughout the length of the compartment. This air, under atmospheric pressure and due to the vacuum induced in the upper portion of the compartment, is caused to bubble out the lower ends of pipes 30 and 31 and rise between plates 10 and 12 and through chamber 11 of separating zone A. The operative effect of this rising column of bubbles is to create an air-lift of considerable force causing a rising of the solid-liquid mixture which impinges against the baffle 15. The latter deflects the whole mass of the mixture toward the sides 2 and 3 of the compartment.

Oxygen dissolved from the air so admitted to the solid-liquid mixture promotes and facilitates chemical activity of the described type between the liquids and solids of the mixture. Gaseous products of these reactions provide gaseous films for the solids in the mixture, reducing the overall specific gravities of the filmed solids. When under reduced pressure the gas films expand, thereby causing them to also rise because of increased buoyancy in a manner heretofore described.

Thus, the solid liquid mixture progresses toward the opening 22 formed by plates 20 and 21 in an upward and downward movement in a manner that can be described as helical.

By coalescence and release of gas by the vacuum, a foam or froth, low in gas and water content, is formed in the restricted opening 22. Such solids, which are not floated as a result of the first air-lift, have countless opportunities for further flotation as the solid-liquid mixture is moved toward the discharge outlet 22. The vacuum lift then causes final discharge of the largely solid material which is emitted through this opening.

The circulation of the liquid-solid mixture through the apparatus is best described as a helical movement through zone A to discharge floated solids through 22 and outlets 42 and 44. The unfloated solids and the liquid residue is ultimately discharged through outlet 26.

The described continuous upward movement of the solid-liquid mixture and its consequent impingement against the baffle 15 creates an efficient agitation promoting maximum chemical activity further beneficial to flotation of the solids.

The oxygen dissolved in the liquid as a result of aeration provided by air drawn into the apparatus through the pipes 30 and 31 causes and increases chemical activity, producing gaseous end products and in sewage and waste water treatment transforms the suspended solids into stable compounds with consequent purification of such waste waters. Such gaseous end products are suitable for forming gaseous films upon the separate solid particles, as heretofore stated.

Furthermore, in sewage and waste water treatment aerobic decomposition is continuously maintained as a result of the step of aeration through the introduction of atmospheric air. Ordinarily, oxygen requirements in activated sludge sewage treatment are high and cannot generally be satisfied by only the oxygen normally present in the incoming sewage. For desirable and beneficial results, oxygen must be continuously supplied and replenished and the present apparatus and process is designed to accomplish this function.

It is emphasized that the importance and advantages of introducing atmospheric air into the reactor by the means described are two-fold: it enables efficient agitation and circulation to be easily accomplished and, secondly, as outlined in the foregoing, it provide a source of oxygen that is essential for efficient purification of impure waters.

It will be further appreciated that my invention uniquely and advantageously combines two fundamental principles of operation: that of using a vacuum to induce constant upward flow of the solid-liquid mixture and introducing oxygen or air through the same medium without the necessity of employing superatmospheric pressures. Although processes and apparatus for the flotation of minerals or for the treatment of waste waters have been devised heretofore, this combination of unique principles accomplishes simply and more effectively the objectives of previous processes.

I claim:

1. An apparatus for scum flotation of materials comprising a vessel having two opposed and upwardly extending partitions therein forming upper and lower separating chambers in said vessel, said partitions being spaced and terminating in vertical lips at their inner sides, thereby forming a passageway between said upper and lower chambers, said lower chamber having opposed parallel plates disposed therein forming an air-lift compartment, a baffle with downwardly extending walls over said compartment and below said partitions, means to admit air under atmospheric pressure to said compartment, means for reducing pressure below atmosphere in said upper chamber, means on one side of said lower chamber to admit said materials, gravity exit means in said upper chamber for said materials, and exit means for the residue of said materials on the other side of said lower chamber.

2. An apparatus for froth flotation of materials comprising a vessel having two opposed and upwardly extending partitions therein forming upper and lower separating chambers in said vessel, said partitions being spaced and terminating in vertical lips at their inner sides, thereby forming a passageway between said upper and lower chambers, gravity exit means for separated materials above and adjacent said partitions, said lower chamber having opposed parallel plates disposed therein forming an air-lift compartment, a baffle with downwardly extending walls over said compartment and below said partitions, means to admit air under atmospheric pressure to said compartment, said last-named means having control valves to regulate the amount of air admitted, means for reducing pressure below atmospheric in said upper chamber, means on one side of said lower chamber to admit said materials, and exit means for the remainder of said materials on the other side of said lower chamber.

3. A process for purifying a solid-liquid fluid mixture containing septic dissolved and suspended solids to render said solids non-septic by partial decomposition due to continuous aeration, agitation and circulation, said process comprising the steps of charging said mixture to an initial separating zone which is under constant vacuum pressure, deflecting the upward flow of said mixture to provide a helical course through said zone, creating a condition of turbulence through said zone by said deflecting step and the application of vacuum pressure, maintaining a vacuum in a second separating zone, thereby to promote rising of both suspended and dissolved solids to said second zone, said second zone being in intercommunication with said first zone at the upper extremity thereof, admitting air under atmospheric pressure to the lower portion of said initial zone to additionally cause solid-dissolving agitation, circulation and oxidation of the solids of said initial zone, said oxidation resulting in partial decomposition of said solids in said initial zone, said oxidation causing said partially decomposed solids to float to said second zone by reason of the buoyancy imparted thereto by adhering gases resulting from said decomposition, separating said floated solids by gravity flow from said second zone, and discharging purified liquid from the lower portion of said initial separating zone.

References Cited in the file of this patent

UNITED STATES PATENTS

| | | |
|---|---|---|
| 1,253,653 | Welsch | Jan. 15, 1918 |
| 1,312,754 | Rowand | Aug. 12, 1919 |
| 1,706,281 | Elmore | Mar. 19, 1929 |
| 2,158,976 | Booth | May 16, 1939 |
| 2,307,154 | Osuna | Jan. 5, 1943 |
| 2,324,400 | Kelley et al. | July 13, 1943 |
| 2,375,282 | Clemens | May 8, 1945 |

FOREIGN PATENTS

| | | |
|---|---|---|
| 510,125 | Great Britain | July 27, 1939 |